United States Patent
Walker, Sr.

(10) Patent No.: US 8,279,840 B2
(45) Date of Patent: Oct. 2, 2012

(54) SYSTEMS AND METHODS FOR PROVIDING LOCATION BASED SERVICES (LBS) UTILIZING WLAN AND/OR GPS SIGNALS FOR SEAMLESS INDOOR AND OUTDOOR TRACKING

(76) Inventor: Jonathan B. Walker, Sr., Rockville, MD (US)

(*) Notice: Subject to any disclaimer, the term of this patent is extended or adjusted under 35 U.S.C. 154(b) by 709 days.

(21) Appl. No.: 12/358,315

(22) Filed: Jan. 23, 2009

(65) Prior Publication Data

US 2009/0196267 A1      Aug. 6, 2009

Related U.S. Application Data

(60) Provisional application No. 61/025,421, filed on Feb. 1, 2008.

(51) Int. Cl.
*H04W 4/00*   (2009.01)

(52) U.S. Cl. .................. 370/338; 455/426.2; 455/456.3

(58) Field of Classification Search .................. 370/338; 455/46.2, 456.32
See application file for complete search history.

(56) References Cited

U.S. PATENT DOCUMENTS

| | | | |
|---|---|---|---|
| 2007/0016654 A1* | 1/2007 | Bowles et al. ................ | 709/217 |
| 2007/0024620 A1* | 2/2007 | Muller-Fischer et al. .... | 345/427 |
| 2007/0265775 A1 | 11/2007 | Tsai et al. | |
| 2008/0008121 A1 | 1/2008 | Alizadeho-Shabdiz | |
| 2009/0121927 A1* | 5/2009 | Moshfeghi ............... | 342/357.03 |
| 2009/0189810 A1* | 7/2009 | Murray .................... | 342/357.14 |

OTHER PUBLICATIONS

Office Action, U.S. Appl. No. 12/697,576, dated Mar. 8, 2012.
PCT/US2009/031759; International Search Report and Written Opinion.

* cited by examiner

*Primary Examiner* — Sai-Ming Chan
(74) *Attorney, Agent, or Firm* — Latimer IP Law, LLC (57) ABSTRACT

Systems and methods for tracking a wireless device are disclosed. According to one aspect, the wireless device includes a hybrid global positioning system (GPS) and wireless local area network (WLAN) circuit board for seamless indoor and outdoor tracking. In embodiments, GPS and WLAN data are combined to obtain a position estimate of the device. In other embodiments, the circuit board automatically switches between WLAN and GPS data for indoor and outdoor environments. A Location Based Services (LBS) algorithm for determining the position of a wireless device using WLAN and/or GPS signals is also disclosed. The LBS algorithm is implemented by way of method steps including: sensing GPS and/or WLAN signals, measuring and/or converting the sensed signals to obtain distance data, fusing the distance data, and applying one or more approximation algorithms to the distance data to obtain a position estimate of the wireless device. A method for rendering position data using a Marching Cubes algorithm is further disclosed.

14 Claims, 6 Drawing Sheets

SYSTEMS AND METHODS FOR PROVIDING LOCATION BASED SERVICES (LBS) UTILIZING WLAN AND/OR GPS SIGNALS FOR SEAMLESS INDOOR AND OUTDOOR TRACKING

CROSS-REFERENCE TO RELATED APPLICATIONS

This application relies on and claims the benefit of U.S. provisional patent application No. 61/025,421, filed date Feb. 1, 2008 the entire disclosure of which is hereby incorporated in its entirety.

BACKGROUND OF THE INVENTION

1. Field of the Invention

The present invention generally relates to the field of mobile positioning. More specifically, the present invention relates to systems and methods for wireless Location Based Services.

2. Description of Related Art

Location-Based Services (LBSs) has emerged as an essential public safety feature of cellular systems, referring to the geographic coordinates of a mobile user, in part to an order issued by the Federal Communications Commission (FCC) in 1996—Emergency 911 (or E-911). Moreover, the wireless location technology has migrated into various profitable industries such as mobile advertising, asset tracking, fleet management, and location-based wireless access security.

In military applications, situation awareness (SAW) technology is needed to allow the future net-centric Warfighter to operate in squads or sub-squad teams, requiring dedicated wireless communications networks and location finding technology for operation effectiveness. Wireless, command and control, and sensor networking technology that provide individual soldiers with a tactical network-centric capability and enable small units to maintain precision location of its team members would have a tremendous impact on the military and its operations. A key component of this needed technology is that the individual soldier system is designed to provide the dismounted soldier with wireless location tracking technology in order for fast rescue missions.

Generally, wireless location technologies fall into two main categories: mobile-based and network-based.

In mobile-based outdoor location systems, the mobile station typically determines its location from signals received by a few base stations or from the Global Positioning Satellite (GPS) system. GPS methods provide global location information and have a relatively high degree of accuracy, however transmitted signal strengths deteriorate tremendously in buildings and around outdoor structures such as trees, bridges, and concrete objects. In military operations, outdoor obstructions continue to plague a central command control that is charged with tracking individual troop movement at all times.

Network-based location technology, on the other hand, relies on some existing WLAN or mobile Ad hoc networks to determine the position of a user. Ad-hoc networks are defined as networks formed by users or devices wishing to communicate, without the necessity or existence of any infrastructure previously established between potential network members. Ad-hoc communication can take place in different scenarios and is independent of any specific device, wireless transmission technology, network, or protocol. Ad-hoc networks can significantly vary in size depending on application. For example, the network can contain two nodes or thousands of nodes that exchange data. Another feature of ad-hoc networks is that nodes are free to enter or leave the network at any time.

To date, the most developed wireless location technologies have been in the areas of GPS, advanced U.S. scientific, and technical capabilities by means of Global System for Mobile Communications (GSM), and Code Division Multiple Access (CDMA) in worldwide commercial applications such as transportation management, directional finding software, and emergency services. In cellular service there are two main competing network technologies: GSM and CDMA. Cellular carriers including Sprint PCS™, Cingular Wireless™, Verizon™ and T-Moblie™ use one or the other.

It is generally accepted that WLAN and sensor (or beacon) networks are best implemented for indoor use while outdoor Location Based Services are well-established with respect to GPS and GSM positioning. In terms of indoor positioning, sensor (or beacon) networks have a longer history of research with a number of different frequency bands including ultrasound, infrared, and Ultra-Wideband. However, one key drawback to sensor networks are the limited coverage areas they support due to various frequency limitations. Therefore, these technologies are all geared toward very small regions, sometimes referred to as Personal Area Networks (PANs). In order to provide wider coverage areas, these networks would require a high concentration of sensors, thereby hindering the cost effectiveness of deploying wide-scale sensor networks.

Although WLAN positioning has attracted much research attention in recent years, many challenges exist. According to Sun et al. ("Signal Processing Techniques in Network Aided Positioning: A survey of state-of-the-art positioning designs" IEEE Signal Processing Magazine, Vol. 22, Issue 4, pp. 12-23 (2005)), different network topologies pose various challenges in mobile positioning. Signal strength and accuracy are other challenges with respect to WLAN indoor positioning. Most WLAN indoor positioning systems are based on received signal strength (or RSS) since such measurements are part of normal operation.

Signal processing techniques for location estimation in 802.11 based wireless networks typically include client-based systems and client-assisted systems. In client-based systems, a model is initially constructed based on received signal strengths within a target area. The position of a mobile device is determined by comparing received signal strengths from each access point with the model. Most of the computational processing for client-based systems is performed remotely, while client-assisted location systems draw resources from client terminals, access points, and sniffing devices to locate the clients in WLAN.

To date, the data collection process for WLAN signal strength models entails a crude method of walking, driving, or flying throughout a region of Wireless Access Points (WAPs) with a laptop running WLAN detection software. One method includes "war-driving" and is practiced by hobbyists, hackers, and security analysts worldwide. WLAN detection software stores the radio beacon signal of WAPs near the moving laptop. Thus, the fixed WAPs can be used as frame of reference coordinates or as triangulation points for newly arriving IEEE 802.11 devices. Examples of software and hardware that may be used for war-driving include: Netstumbler V.4.0, Dell Laptop Latitude C500/600 (running Windows 98 or higher), Compaq WL 110 Wireless PC Card, DeLorme Street Atlas 2004 USA, Dell TrueMobile 1150 WLAN Adapter, M.S. MapPoint 2004, DeLorme Earthmate® GPS w/USB port, Earthmate® Hyperformance GPS Receiver w/RS232 connector, MaxRAD™ 2.4 GHz MIG Omnidirectional tape mount antenna. In one example, a beacon database of three thousand wireless access points was collected on a drive throughout the city of Rockville, Md., running Netstumbler, a WLAN card, and an omni-directional antenna retrieved the IEEE 802.11 RF beacon signals. One major drawback of war-driving techniques, however, is that such processes are extremely time consuming (e.g., on the order of eight hours per 5 square miles).

While various approaches for combining one or more LBS technologies have been proposed, most are directed toward outdoor applications focused on the cellular or GPS market. There have been very few commercial applications that utilize WLAN Location Based Services. While U.S. Pat. No. 7,130,646 to Wang discloses WLAN-aided Global Positioning Systems, the invention does not provide seamless indoor and outdoor tracking and is limited to WLAN RSSI measurements. In addition, Wang requires an access point (or beacon) database and lookup table to merely determine a "best-matching" position of the device.

Moreover, while cellular networks, Global Positioning Systems (GPS) and wireless E911 services generally address the issue of location finding, these technologies cannot provide an indoor geo-location because they face various electrical magnetic limitations (e.g., radio interference, penetration loss, and multi-path conditions). At the same time, current indoor positioning techniques lack precision and accuracy.

The inventor has recognized that there exists a need in the art to provide a system and method for accurate positioning of WLAN-based wireless devices. The inventor has also recognized that there also exists a need to provide a system, method, and device for seamless indoor and outdoor tracking utilizing WLAN and/or GPS signals. Furthermore, it has become apparent to the inventor that there exists a need to provide improved two and three dimensional rendering of mobile device position.

SUMMARY OF THE INVENTION

The present disclosure provides solutions to needs in the art by providing systems and methods for improved Location Based Services (LBS). Advantages to embodiments of the systems and methods disclosed herein include: the ability to track fixed or mobile assets and users (such as rapidly moving troops) with embedded IEEE 802.11 devices utilizing both GPS and WLAN technology; tracking indoors with higher accuracy so that a wider range of applications can be supported; and reduced computational overhead for mobile devices with energy constraints. Another advantage to embodiment of the disclosed systems and methods is that a beacon database (e.g., of access points) is not required.

According to one aspect of the invention, a system for seamless indoor and outdoor tracking of a wireless device is provided. The system includes a wireless device having a hybrid global positioning system (GPS) and wireless local area network (WLAN) circuit board. Preferably, the circuit board includes: a GPS device capable of sensing GPS satellite signal data; a WLAN device capable of sensing WLAN signal data; a processor that measures and/or converts GPS signal data to distance data; a processor that measures and/or converts WLAN signal data to distance data; and a processor capable of fusing GPS and/or WLAN distance data. In addition, the system further can comprise a processor that receives the fused distance data and applies the distance data to one or more approximation algorithms to obtain a position estimate of the wireless device. Preferably, the sensed WLAN signals correspond to signals defined the physical layer of the IEEE 802.11 standard. In embodiments, the one or more approximation algorithm(s) include: Discrete Least Squares (DLS), Discrete Least Squares (DLS) on Exponential Data, and/or Fast Fourier Transform (FFT).

According to another aspect, a method for seamless indoor and outdoor tracking of a wireless device having global positioning system (GPS) and wireless local area network (WLAN) capability is provided, the method including: sensing GPS and/or WLAN signals using the wireless device; measuring and/or converting the sensed signals to obtain distance data; fusing the distance data; and applying one or more approximation algorithms to the distance data to obtain a position estimate of the wireless device. In embodiments, the sensed WLAN signals correspond to signals defined in the physical layer of the IEEE 802.11 standard. In embodiments, the one or more approximation algorithm(s) include: Discrete Least Squares (DLS), Discrete Least Squares (DLS) on Exponential Data, and/or Fast Fourier Transform (FFT).

According to another aspect, a system for determining a position of a wireless device is provided. The system includes: a wireless device capable of sensing WLAN signal data; a processor that measures and/or converts WLAN signal data to distance data; and a processor configured to apply the distance data to one or more approximation algorithms to obtain a position estimate of the wireless device.

According to yet another aspect, a method for determining a location of a fixed or mobile wireless device is provided. The method includes: sensing one or more WLAN signals with the wireless device; measuring and/or converting the sensed signals to obtain distance data; and applying the distance data to one or more approximation algorithms to obtain a position estimate of the wireless device.

According to yet another aspect, a method of displaying the location of a wireless device having WLAN and/or GPS capability in two or three dimensions is provided. The method includes: obtaining position coordinates for the wireless device; applying a Marching Cubes algorithm to the coordinates to extract surface information; and rendering and displaying the surface information in two or three dimensions.

According to yet another aspect, a method for tracking a wireless device is provided The method includes: sensing GPS and/or WLAN signals using the wireless device; measuring and/or converting the sensed signals to obtain distance data; fusing the distance data; applying one or more approximation algorithms to the distance data to obtain a position estimate for the wireless device; iteratively performing the above steps to obtain one or more position coordinates for the device; applying a Marching Cubes algorithm to the obtained coordinates to extract surface information; and rendering and displaying the surface information in two or three dimensions.

DETAILED DESCRIPTION OF VARIOUS EMBODIMENTS OF THE INVENTION

Reference will now be made in detail to various exemplary embodiments of the invention, examples of which are illustrated in the accompanying drawings. The following detailed description is provided to supply a fuller description of certain embodiments of the invention, and is not intended as a limiting disclosure of all embodiments of the invention. Rather, those of skill in the art will be able to understand the full scope of the invention after consideration of the above broad description, the following detailed description of certain embodiments, and the claims.

Figure 1:
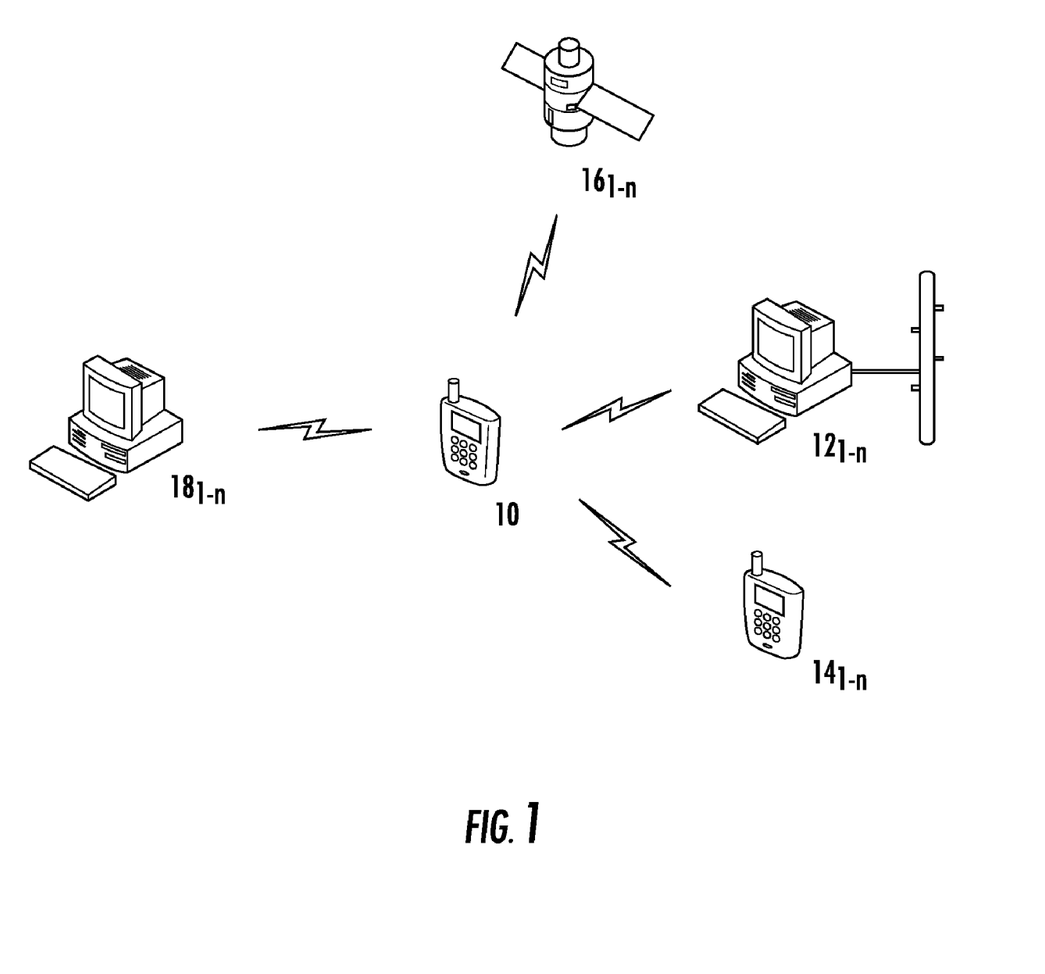
FIG. 1 depicts an exemplary system for determining the location of a wireless device according to one aspect of the present disclosure.

According to one aspect, a system for seamless indoor and outdoor tracking of a wireless device is provided. FIG. 1 shows a system for determining the location of a wireless device 10. The wireless device 10 may correspond to a computer, laptop, PDA, cell phone, Blackberry™, or any other wireless device with embedded IEEE 802.11, or equivalent, capabilities. Preferably, wireless device 10 is capable of sensing WLAN signals from other devices $12_{1-n}$ and/or $14_{1-n}$. For example, devices $12_{1-n}$ may correspond to network access points while devices $14_{1-n}$ may correspond to other wireless devices in an ad-hoc environment. Preferably, communication between the wireless device 10 and devices $12_{1-n}$ and/or $14_{1-n}$ takes place in accordance with any of the IEEE 802.11 standards as disclosed, for example, in ANSI/IEEE Std. 802.11, 1999 Edition (R2003), incorporated herein by reference in entirety. According to another aspect, the wireless device 10 is also capable of sensing signals from one or more Global Positioning Satellites $16_{1-n}$. In addition, the wireless device 10 is further in communication with a processor $18_{1-n}$ and is able to communicate received position data to the processor $18_{1-n}$.

Figure 2:
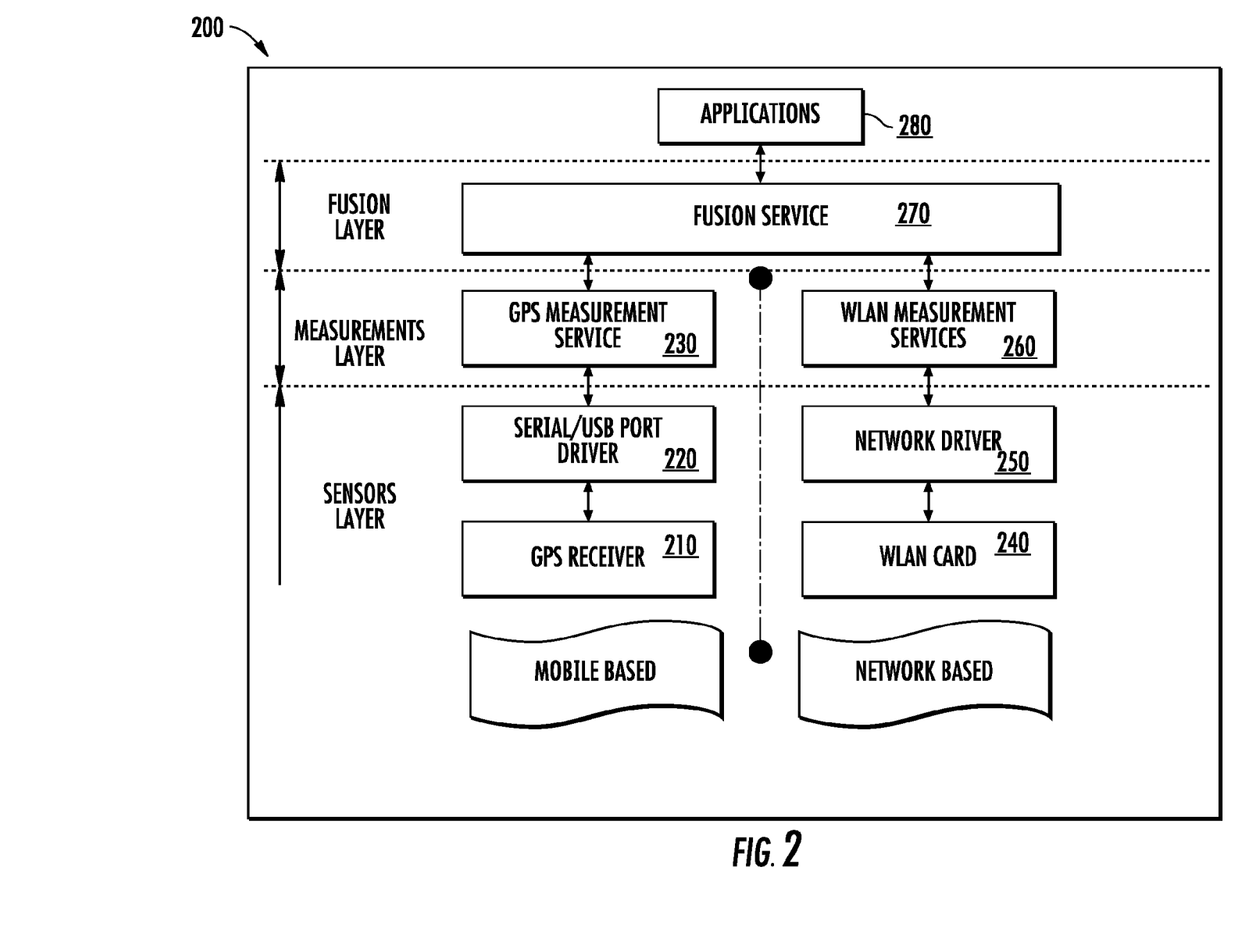
FIG. 2 depicts an exemplary block diagram of a hybrid GPS and WLAN circuit board for indoor and outdoor Location Based Services (LBS) according to another aspect of the present disclosure.

Preferably, the wireless device 10 includes a circuit board (not shown) that comprises: a WLAN card, a GPS receiver, and one or more processors (further described with respect to FIG. 2). The processor 18 is capable of iteratively receiving position data from the wireless device, and applying one or more approximation algorithms to the position data to obtain a position estimate of the wireless device.

FIG. 2 illustrates an exemplary hybrid global positioning system (GPS) and wireless local area network (WLAN) circuit board 200 for seamless indoor and outdoor tracking according to the principles of the present disclosure. The circuit board includes: a GPS device 210 capable of sensing GPS satellite signal data; a WLAN device 240 capable of sensing WLAN signal data; a processor 230 that measures and/or converts GPS signal data to distance data; a processor 260 that measures and/or converts WLAN signal data to distance data; and a processor 270 capable of fusing GPS and/or WLAN distance data. In embodiments, the GPS device 210 may comprise a conventional GPS receiver, and the WLAN device 240 may comprise a conventional WLAN card. In addition, the circuit board may also include a serial/USB port driver 220 for communicating sensed signals to processor 230, and a Network driver 250 for communicating sensed signals to processor 260. In embodiments, processor 230 provides GPS measurement services, processor 260 provides WLAN measurement services, and processor 270 provides fusion services. Further applications (such as rendering or additional processing, etc.) may also be provided at 280. It is understood that the functions performed by the processors may be implemented in whole, or in part, in hardware and/or software and further that any of the functions discussed above can be implemented on a single, or multiple, processors. Moreover, depending upon size and processing capability associated with the circuit board 200, some of the processors and/or functions may be implemented remotely, for example at a processor $18_{1-n}$.

The framework of FIG. 2 further depicts three layers: a Sensor Layer, a Measurements Layer, and a Fusion Layer. The Sensor Layer consists of location-sensing hardware and software drives for detecting raw signal data. Further up, the Measurement Layer converts the raw sensor data into location measurements. For example, the received signal data may be converted to dBm. Additionally or alternatively, distance data may be derived from the received signal data as will be appreciated by those skilled in the art. The Fusion Layer serves to merge streams of measurement data into a single position estimate. It is to be understood that the Fusion Layer and corresponding processing capabilities may be performed on the circuit board, or remotely (e.g., by processor 18), for example if space or processing capability of the circuit board are limited.

In embodiments, the circuit board 200 is capable of switching between the GPS device 210 and WLAN device 240 based on the detected indoor or outdoor environment. For example, depending on the location of the fixed or mobile IEEE 802.11 device, the RF signal from one or both devices will garner a reasonable approximation of the coordinates. In an outdoor location or rural environment, the GPS coordinates will be obtained from a constellation of twenty-four or more earth orbiting satellites, commercially available at 1 pulse per second (pps) with standard frequencies such as 1, 5, and 10 MHz. In an indoor location, the hybrid circuit board is configured to toggle (or switch) to a WLAN transceiver mode so that a flawless transition is maintained between indoor and outdoor environments. The switch may be implemented in hardware or in software (e.g., at processor 270) and triggered e.g., by predetermined signal threshold conditions.

Figure 3:
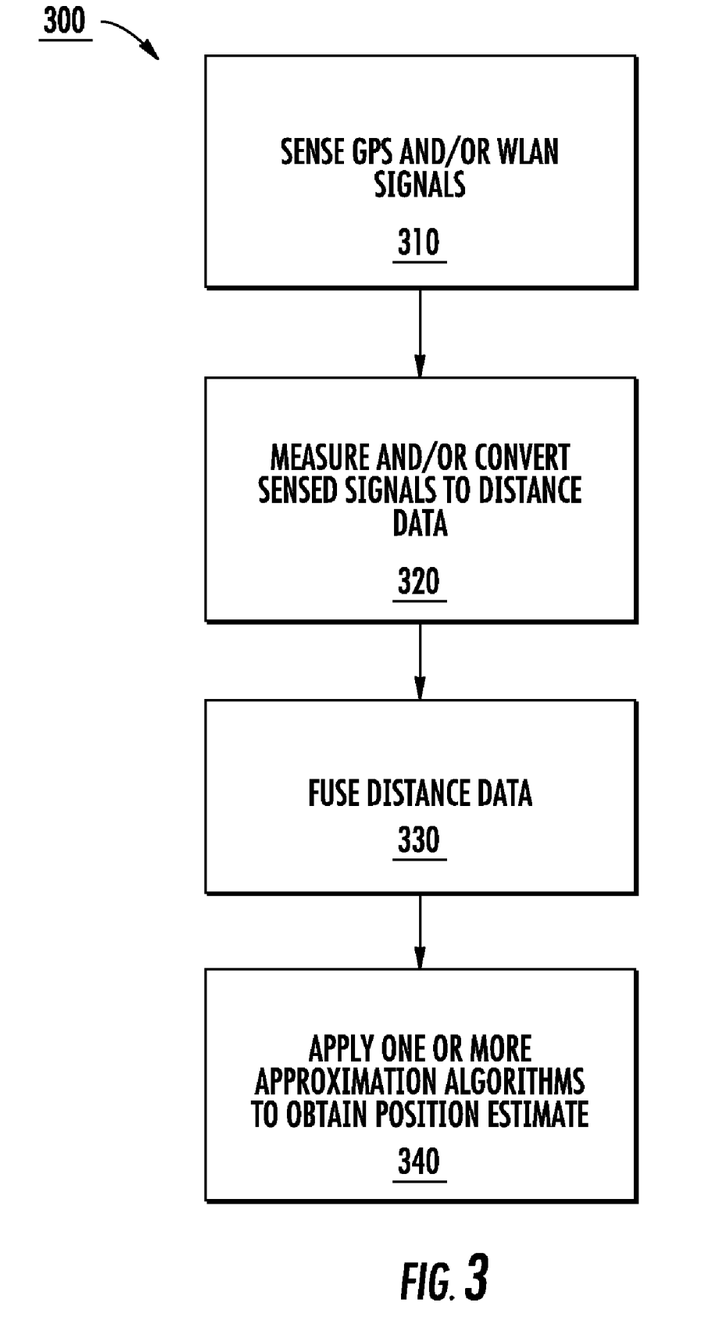
FIG. 3 depicts exemplary method steps for determining the location of a wireless device according to another aspect of the present disclosure.

Referring to FIG. 3, a method for tracking of a wireless device 10 is shown generally at 300. The method includes the steps of: sensing GPS and/or WLAN signals using the wireless device 310; measuring and/or converting the sensed signals to obtain distance data 320; fusing the distance data 330; and applying one or more approximation algorithms to the fused distance data to obtain a position estimate of the wireless device 340.

According to another aspect, a method for determining an accurate indoor or outdoor location of a fixed or mobile wireless device 10 is provided, based on WLAN data. The method includes: sensing WLAN signals with the wireless device 310; measuring and/or converting the sensed signals to obtain distance data 320; and applying the distance data to one or more approximation algorithms 340 to obtain a position estimate of the wireless device. According to this aspect, an accurate position of a wireless device 10 is estimated by applying one or more approximation algorithms to WLAN data obtained from the physical layer. In embodiments, the method steps may be iteratively performed e.g., to track the position of a moving device.

Preferably, at least portions of the above discussed method steps comprise part of a Location Based Services (LBS) Algorithm used to improve the degrees of precision and accuracy in locating a fixed or mobile IEEE 802.11 device. Specifically, the LBS algorithm exploits two components and ten subcomponents defined in the IEEE 802.11 standard to yield overlaying coordinates, which in turn will garner the coordinates of a mobile or fixed IEEE 802.11 device. The data from various components and subcomponents are obtained to render a reasonable approximation of the overlaying coordinates through numerical analysis. Table 1 illustrates the IEEE physical layer components and subcomponents as defined in the IEEE 802.11 specification.

TABLE 1

Transmit Output Spectrum

| | |
|---|---|
| 1. Transmitter Power in dBm | 2. Receiver Power in dBm |
| 3. Average Power [Transmit & Recieve] | 4. Output Transmit Power in dBm |
| 5. Transmitter Spectrum Mask in dBm vs. Frequency in GHz | 6. Power Density in dBm vs. Frequency in KHz |
| 7. Complementary Cumulative Distribution Function in dBm vs. Probability | 8. Peak Output Power in dBm |

Transmit Modulation Accuracy

| | |
|---|---|
| 1. Constellation Error in dB | 2. Error Vector Magnitude (EVM) |

Typically, IEEE 802.11 devices comprise a physical (PHY) layer that transmits and receives data through a Radio Frequency (RF) medium. The device's transmitter and receiver power are the main factors in the fixed or mobile device's coverage area. Therefore, the transmit output spectrum and modulation accuracy are directly related to the RF signal strength, RF coverage, and the distance to and from the transceiver. A drawback of most conventional WLAN positioning techniques is that they rely primarily on Received Signal Strength Indicator (RSSI) values to determine location.

However, the IEEE 802.11 standard does not stipulate the relationship between the Receive Signal Strength Indicator (RSSI) value and the RF energy levels that are measured in milliwatts (mW) or decibel milliwatts (dBm). Moreover, the standard defines the RF energy as an integer with an allowable range of 0-255 (a one-byte value) called the Receive Signal Strength Indicator (RSSI). Individual vendors have chosen to provide their own levels of accuracy, granularity, and range for the actual power. Therefore, it is a challenge to develop an accurate or precise location of a mobile object utilizing RSSI because the frame of reference varies from vendor to vendor.

Advantageously, the present disclosure notes a direct relationship between the various parameters and conversions from one unit to another can be performed with varying degrees of accuracy. For example, when RF energy is measured in milliwatts (mW), the signal level is the amount of energy transmitted. The decibel milliwatt (dBm) is a logarithmic measurement of signal strength, and dBm values can be converted to and from mW values. The formula used for the conversion is:

$$dBm = \log(mW) * 10 \quad (1)$$

Approximation Theorems

Data points from the various components and subcomponents are therefore acquired and/or converted to allow a reasonable approximation of the three dimensional (3D) overlaying coordinates to be obtained through numerical analysis. Because of the amount of computational overhead, preferably the numerical analysis computations are performed remotely, for example at processor 18. Preferably, the degree of precision and accurate coordinates of a fixed or mobile device makes use of one or more of the following exemplary approximation theories: Discrete Least Squares (DLS), DLS on Exponential Data, and the Fast Fourier Transform (FFT).

However, it is understood that other approximation algorithms may also be used depending upon the application.

Discrete Least Squares (DLS):

The least squares method is the most convenient procedure for determining the best linear approximations. Likewise, the least squares approach will put substantially more weight on a point that is out of line with the rest of the data but not allow that point to completely dominate the approximation. In addition, the values obtained from the linear least squares procedures are unbiased estimates for the equation that describes the mean value, if the data has its mean distributed in a linear manner. Moreover, the values obtained can be used to calculate an unbiased estimator for the variance associated with the distribution.

The issue of fitting the least squares line to a collection of data involves minimizing:

$$\sum_{i=1}^{m} [y_i - (ax_i + b)]^2 \quad (2)$$

Because m represents the number of samples, the coefficients of a and b are determined by the following equations:

$$a = \frac{m\left(\sum_{i=1}^{m} x_i y_i\right) - \left(\sum_{i=1}^{m} x_i\right)\left(\sum_{i=1}^{m} y_i\right)}{m\left(\sum_{i=1}^{m} x_i^2\right) - \left(\sum_{i=1}^{m} x_i\right)^2} \quad (3)$$

&

$$b = \frac{\left(\sum_{i=1}^{m} x_i^2\right)\left(\sum_{i=1}^{m} y_i\right) - \left(\sum_{i=1}^{m} x_i y_i\right)\left(\sum_{i=1}^{m} x_i\right)}{m\left(\sum_{i=1}^{m} x_i^2\right) - \left(\sum_{i=1}^{m} x_i\right)^2}$$

DLS on Exponential Data:

Because the RF signal is normally measured in milliwatts (mW) or decibel milliwatts (dBm), the signal strength is not linear by nature but is inversely proportional to the square of the distance. Moreover, the dBm values are a logarithmic measurement of signal strength. It is appropriate to apply the discrete least square on exponential data. This requires the approximating function to be of the form:

$$y = be^{ax} \quad (4)$$

or $$y = bx^a, \quad (5)$$

for some constant a and b. Using the equations in (3), the following coefficients of a and b are determined by the following equations:

$$a = \frac{m\left(\sum_{i=1}^{m} x_i \ln y_i\right) - \left(\sum_{i=1}^{m} x_i\right)\left(\sum_{i=1}^{m} \ln y_i\right)}{m\left(\sum_{i=1}^{m} x_i^2\right) - \left(\sum_{i=1}^{m} x_i\right)^2} \quad (6)$$

&

-continued $$b = \frac{\left(\sum_{i=1}^{m} x_i^2\right)\left(\sum_{i=1}^{m} \ln y_i\right) - \left(\sum_{i=1}^{m} x_i \ln y_i\right)\left(\sum_{i=1}^{m} x_i\right)}{m\left(\sum_{i=1}^{m} x_i^2\right) - \left(\sum_{i=1}^{m} x_i\right)^2}$$

Fast Fourier Transform:

The interpolation of large amounts of equally spaced data by trigonometric polynomials can produce very accurate results. The approximation of thousands of data points is not unusual in areas requiring trigonometric interpolation. The method described by Cooley and Tukey has become known as either the Cooley-Tukey Algorithm or the Fast Fourier Transform (FFT) Algorithm. The algorithm is an appropriate approximation technique used in areas such as antenna field patterns as well as the 802.11 RF medium. This least squares trigonometric polynomial is as follows:

$$s_m(x) = \frac{a_0 + a_m \text{Cos}(mx)}{2} + \sum_{k=1}^{m-1} (a_k \text{Cos}(kx) + b_k \text{Sin}(kx)) \quad (7)$$

$$a_k = \frac{1}{m} \sum_{j=0}^{2m-1} y_j \text{Cos}(kx_j); k = 0, 1, \ldots, m \quad (8)$$

$$a_k = \frac{1}{m} \sum_{j=0}^{2m-1} y_j \text{Cos}(kx_j); k = 0, 1, \ldots, m \quad (9)$$

Figure 4:
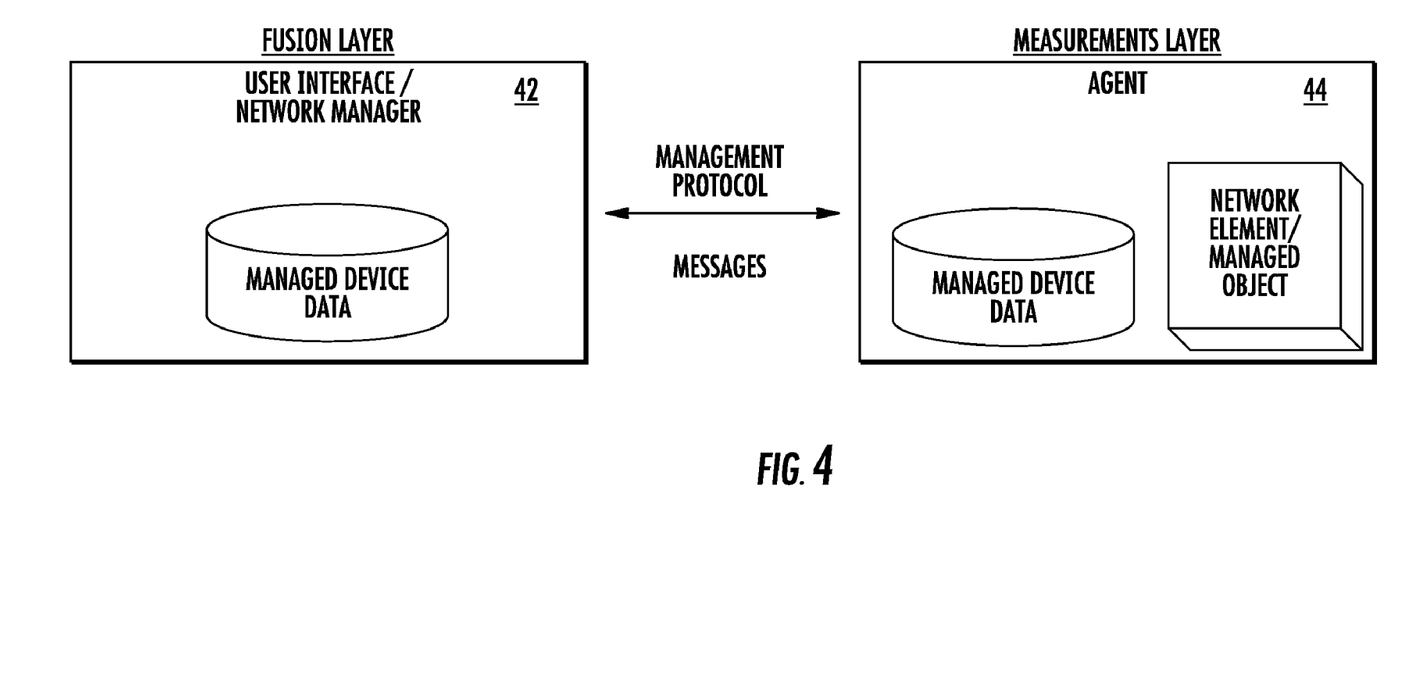
FIG. 4 depicts communication between the Fusion Layer and Measurement Layer according to principles of the present disclosure.

FIG. 4 illustrates communication of data between the Measurements Layer and the Fusion Layer, which preferably uses SNMP. Because SNMP is a universal protocol, it is well-suited with GPS and WLAN boards. Traditionally, the Simple Network Management Protocol (SNMP) has been used by network management systems to communicate with network elements or devices. The Simple Network Management Protocol (SNMP) is an Internet protocol suite defined by the Internet Engineering Task Force (IETF) as set forth in RFC 2821 and incorporated herein by reference in its entirety. Implicit in the SNMP architectural model is a collection of network management stations and network elements or devices. Network management stations execute management applications which monitor and control network elements. Network elements are devices such as hosts, gateways, terminal servers, devices, and the like, which have management agents responsible for performing the network management functions requested by the network management stations.

SNMP is used to communicate management information between the network management stations and the agents in the network elements. Essentially, the SNMP agent, i.e., the interface between the manager and the network element(s), runs on each managed device and exposes management data on the network manager as variables (such as "free memory", "system name", "number of running processes", "default route", etc.). These variables can either be queried (or sometimes set) by the manager application or provided unsolicited by the agent to the manager. In essence, the manager provides the interface between the human network manager and the management system. The manager and agent use a Management Information Base (MIB) and a relatively small set of commands to exchange information. The MIB is extensible, which means that new variables, i.e., additional management data, can be added to both the network element and to the manager application.

In embodiments, the wireless device 10 may correspond to a network element comprising an SNMP agent and Management Information Base (MIB) (not shown), and processor 18 may correspond to a network manager also comprising a Management Information Base (MIB) (not shown). In embodiments, the Management Information Base (MIB) comprises information regarding the components and sub-components of the physical layer as defined in the IEEE 802.11 standard.

According to yet another aspect, a method for tracking a wireless device is provided, including: sensing GPS and/or WLAN signals using the wireless device; measuring and/or converting the sensed signals to obtain distance data; fusing the distance data; applying one or more approximation algorithms to the distance data to obtain a position estimate for the wireless device; iteratively performing the above steps to obtain one or more position coordinates for the device; applying a Marching Cubes algorithm to the obtained coordinates to extract surface information; and rendering and displaying the surface information in two or three dimensions.

Figure 5:
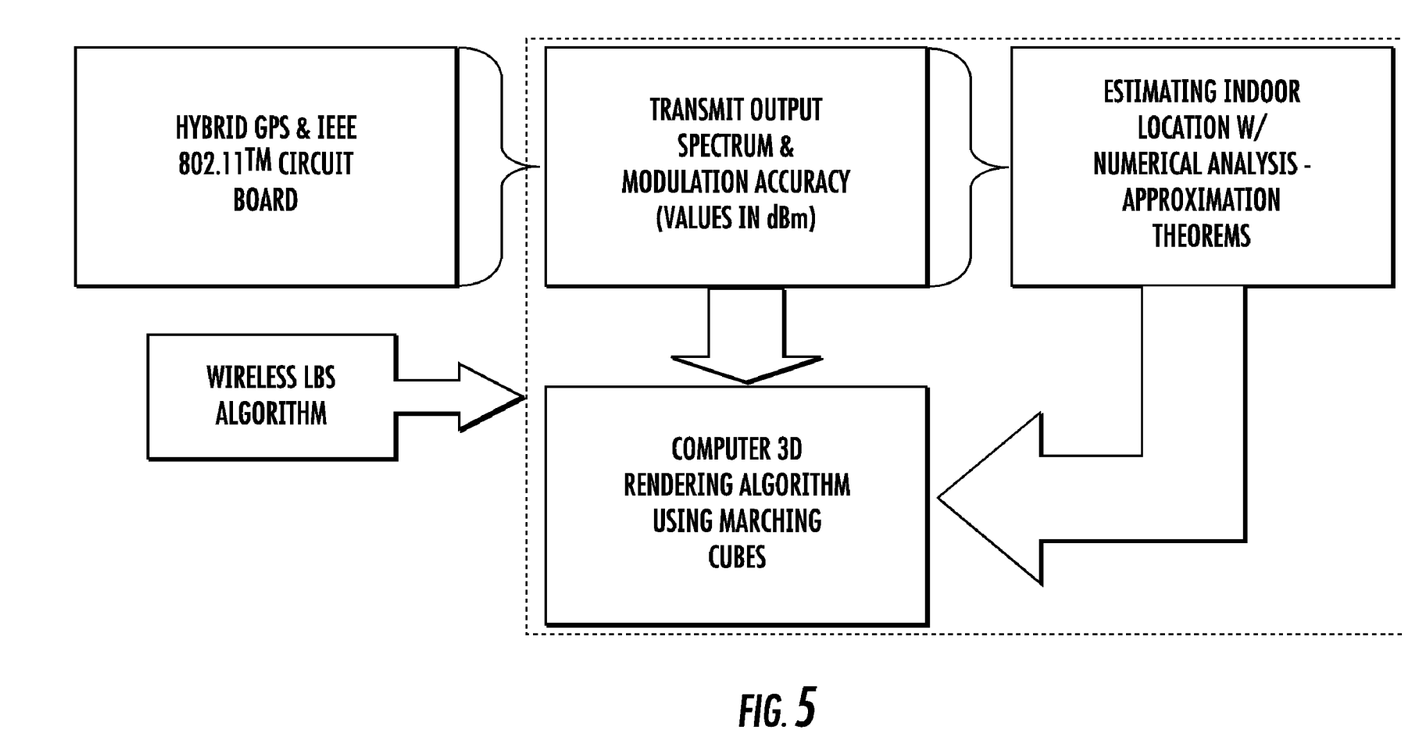
FIG. 5 depicts a flowchart showing use of a hybrid GPS and WLAN circuit board in conjunction with a wireless Location Based Services (LBS) algorithm and computer rendering algorithm.

FIG. 5 depicts a flowchart showing a hybrid GPS and WLAN circuit board used in conjunction with the disclosed LBS algorithm and computer rendering algorithm. As shown in FIG. 5, the data output from the hybrid circuit board is communicated to a computer, e.g., processor 18, where one or more approximation algorithms are applied to estimate the position of the device. Estimated positions are applied to a rendering algorithm such as Marching Cubes (described below) to display the location of the device in two or three dimensions.

3D Rendering

According to a further aspect, a method of displaying the location of a wireless device having WLAN and/or GPS capability in two or three dimensions is provided. The method includes obtaining position coordinates for the wireless device using the disclosed systems and methods, applying a Marching Cubes algorithm to the coordinates to extract surface information, and rendering and displaying the surface information in two or three dimensions. The Marching Cubes algorithm is described by Lorensen and Cline in "Marching Cubes: A High Resolution 3D Surface Construction Algorithm", Computer Graphics (SIGGRAPH '87 Proc.), vol. 21, pp. 163-169, 1987, and is incorporated herein by reference in its entirety.

Figure 6:
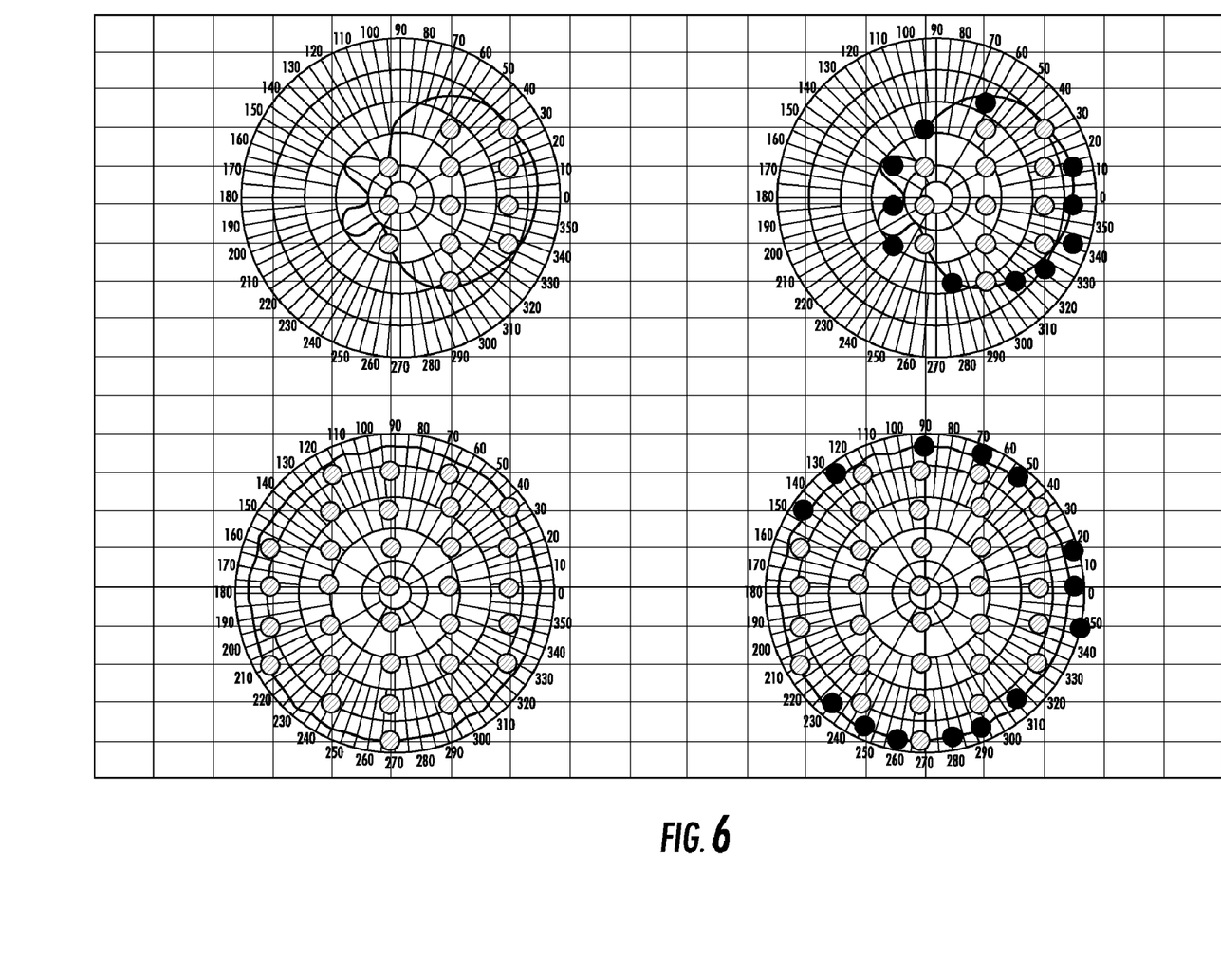
FIG. 6 depicts a two dimensional rendering utilizing the Marching Cubes Algorithm.

Computational geometry performs its routine on geometrical objects known as polygons. Polygons are a convenient representation for many real-world objects, in part because they can be easily manipulated computationally. FIG. 6 shows a two dimensional grid of squares equivalent to the cubes from the three dimensional algorithm. The squares are referred to as "cells" (or "voxels" for three dimensions). Here, the RF pattern is the shape being approximated using lines (instead of polygons for three dimensions). The sphere on the top left of FIG. 6 is an e-plane and the circle on the bottom right of FIG. 6 is an h-plane retrieved from a WAP. The Marching Cubes Algorithm will "march" through each of the cells (or voxels) testing the corner points and replacing the cell (or voxel) with an appropriate set of lines (or polygons). The sum total of all polygons generated will be a surface that approximates that data set.

The first step to the rendering is to calculate the corners that are inside the RF pattern (represented by the lighter dots). Afterwards, a vertex is positioned approximately halfway between an inside corner and any outside corners that are connected by the edge of a cell (represented by the darker dots). The Marching Cubes algorithm tests the corner of each cell (or voxel) in the scalar field as being either above or below a given threshold. This will yield a collection of boxes with classified corners. The result of the Marching Cubes algorithm is a smooth surface that approximates the isosurface that is constant along a given threshold. This will allow a three dimensional volume to be displayed. The interpolations of large amounts of equally spaced data by trigonometric polynomials can thereby produce accurate results.

Preferably, the two or three dimensional rendering is performed remotely by a processor such as 18. A two dimensional grid or three dimensional volume may be displayed on a display of processor 18, printed and/or sent to another computer and displayed. In addition, while two and three dimensional rendering of position data using the Marching Cubes algorithm has been disclosed, it is understood that other two and three dimensional rendering algorithms may also be used.

In embodiments, portions of the disclosure are implemented by way of computer software. The software may be implemented by one or more devices such as wireless device 10 and processor 18. The computer software may be any set of instructions that can be understood and implemented by a computer and thus take the form of one or more computer programs and/or file sets. The software can be written in any computer language, and can be provided in any form, such as in the form of source code, object code, computer code, flow diagrams, or any other means by which those in the art convey information for implementation by way of computers. In general, the software of the invention comprises instructions for implementing the methods of the invention. The software may comprise all of the instructions in a single file or program, or the instructions may be separated into multiple files or programs, which when executed in conjunction with each other, execute the method of the invention.

Those of skill in the art will immediately realize that the present invention may be provided entirely as hardware, entirely as software, or as a combination of software and hardware. It should also be apparent that the present invention may be provided as a computer program product on a computer-readable storage medium, such as that having a computer-readable program.

The present invention has been described at times above with reference to block diagrams and flowcharts. It is to be understood that each block of the block diagrams and flowcharts can be implemented by computer program instructions (i.e., software), which may be comprises on a general purpose computer or processor, special purpose computer or processor, or other programmable data processing apparatus to produce a machine or device. Execution of the instructions on the machine or device provides a means for implementing functions depicted in the diagrams and/or flowcharts.

It will be apparent to those skilled in the art that various modifications and variations can be made in the practice of the present invention and in construction of the system and its component devices and software without departing from the scope or spirit of the invention. Other embodiments of the invention will be apparent to those skilled in the art from consideration of the specification and claims, and from practice of the invention. It is intended that the specification be considered as exemplary only.

The invention claimed is:

1. A method for seamless indoor and outdoor tracking of a wireless device having global positioning system (GPS) and wireless local area network (WLAN) capability, the method comprising:
sensing raw signal data of GPS and WLAN signals using the wireless device;
measuring the sensed signals and converting them into location measurements to obtain GPS and WLAN distance data;
fusing the GPS and WLAN data by merging streams of measurement data;
applying one or more approximation algorithms to the GPS and WLAN data to obtain a position estimate of the wireless device; and
repeating the above actions one or more times to track movement of the wireless device,
wherein performing the sensing, measuring, fusing, and applying steps two or more times provides seamless indoor and outdoor tracking of the wireless device.

2. The method of claim 1, wherein the step of sensing WLAN signals includes sensing two or more components or subcomponents at the physical layer.

3. The method of claim 1, wherein the approximation algorithm(s) correspond to one or more of: Discrete Least Squares (DLS), Discrete Least Squares (DLS) on Exponential Data, or Fast Fourier Transform (FFT).

4. A system for seamless indoor and outdoor tracking of a wireless device, the system comprising:
a wireless device having a hybrid global positioning system (GPS) and wireless local area network (WLAN) circuit board, the circuit board comprising:
a GPS device capable of sensing raw signal data of GPS satellite signals;
a WLAN device capable of sensing raw signal data of WLAN signals;
a processor that measures the GPS signals and converts them into location measurements to obtain GPS distance data;
a processor that measures the WLAN signals and converts them into location measurements to obtain WLAN distance data;
a processor capable of fusing the GPS and WLAN distance data by merging streams of measurement data; and
a processor that receives the fused data and applies one or more approximation algorithms to the data to obtain a position estimate of the wireless device.

5. The system of claim 4, wherein the circuit board further includes a switch capable of switching between GPS signal data and WLAN signal data based on received signal strength.

6. The system of claim 4, wherein the WLAN signals correspond to two or more components or subcomponents at the physical layer.

7. The system of claim 4, wherein the approximation algorithm(s) correspond to one or more of: Discrete Least Squares (DLS), Discrete Least Squares (DLS) on Exponential Data, or Fast Fourier Transform (FFT).

8. A method for determining a location of a fixed or mobile wireless device, the method comprising:
sensing two or more raw signal data of WLAN signals at the physical layer using the wireless device;
measuring the sensed signals and converting them into location measurements to obtain WLAN distance measurement data; and
applying one or more approximation algorithms to the WLAN distance measurement data to obtain a position estimate of the wireless device,
wherein performing the sensing, measuring, and applying steps two or more times results in determining a location of a fixed or mobile wireless device.

9. The method of claim 8, wherein the measuring step includes converting the measurement data to units of dBm.

10. The method of claim 8, wherein the approximation algorithm(s) correspond to one or more of: Discrete Least Squares (DLS), Discrete Least Squares (DLS) on Exponential Data, or Fast Fourier Transform (FFT).

11. A system for determining a position of a wireless device, the system comprising:
- a wireless device capable of sensing raw WLAN signal data;
- a processor that measures and/or converts WLAN signal data to distance data by converting the signal data into location measurements; and
- a processor configured to apply the distance data to one or more approximation algorithms to obtain a position estimate of the wireless device.

12. The system of claim 11, wherein the sensed signal data corresponds to two or more components or subcomponents at the physical layer.

13. A method of displaying the location of a wireless device having WLAN and/or GPS capability in two or three dimensions, the method comprising:
- obtaining position coordinates for the wireless device based on GPS and/or WLAN distance data;
- applying a Marching Cubes algorithm to the coordinates to extract surface information;
- rendering the surface information in two or three dimensions; and
- displaying the two or three dimensional rendering on a display.

14. A method for determining the position of a wireless device, the method comprising:
- sensing raw data of GPS and/or WLAN signals using the wireless device;
- measuring the sensed signals and converting them into location measurements to obtain GPS and/or WLAN distance data;
- applying one or more approximation algorithms to the GPS and WLAN distance data to obtain a position estimate of the wireless device;
- iteratively performing the above steps to obtain one or more position coordinates for the device;
- applying a Marching Cubes algorithm to the coordinates to extract surface information;
- rendering the surface information in two or three dimensions; and
- displaying the two or three dimensional rendering on a display.

* * * * *